Oct. 18, 1932.  J. REID  1,882,904
APPARATUS FOR PREPARING PRESERVATIVES
Filed Oct. 11, 1929   2 Sheets-Sheet 1
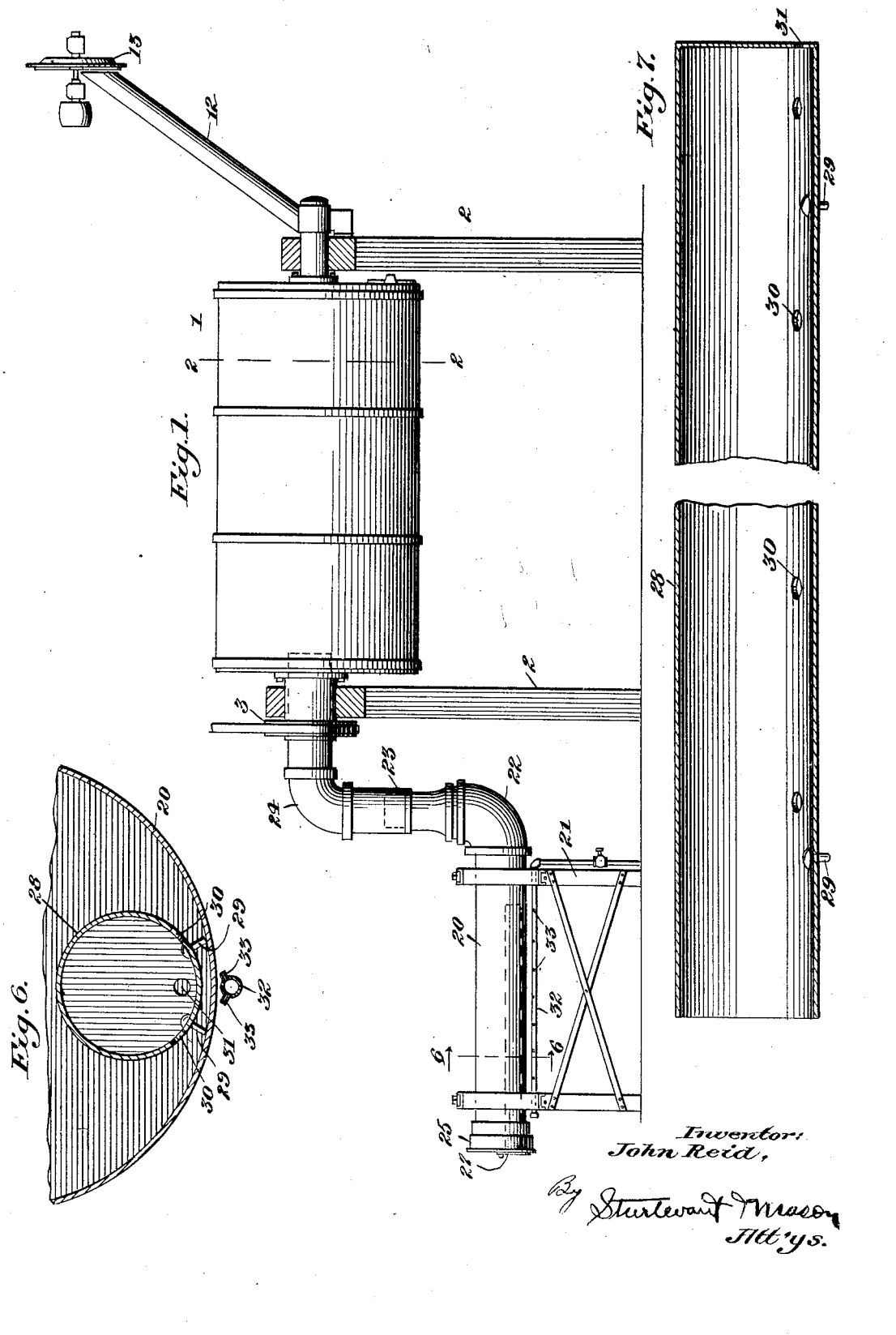
Inventor:
John Reid,
By Sturtevant & Mason
Att'ys.

Oct. 18, 1932.   J. REID   1,882,904
APPARATUS FOR PREPARING PRESERVATIVES
Filed Oct. 11, 1929   2 Sheets-Sheet 2
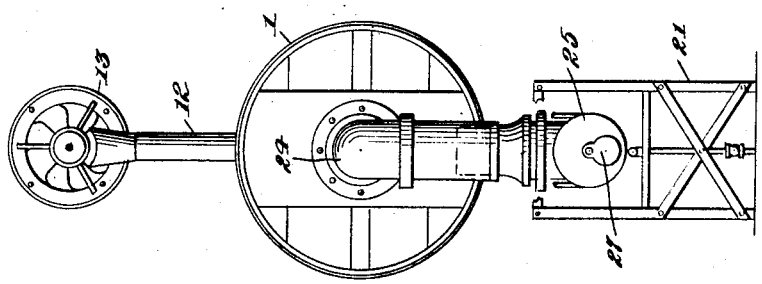
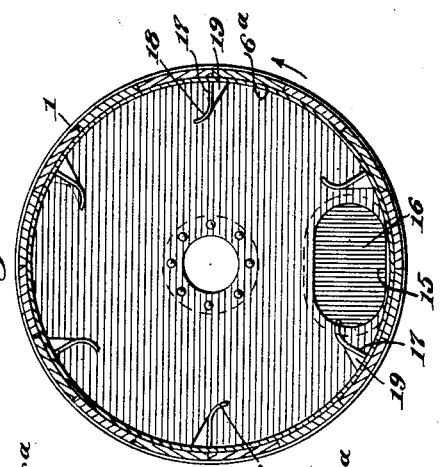
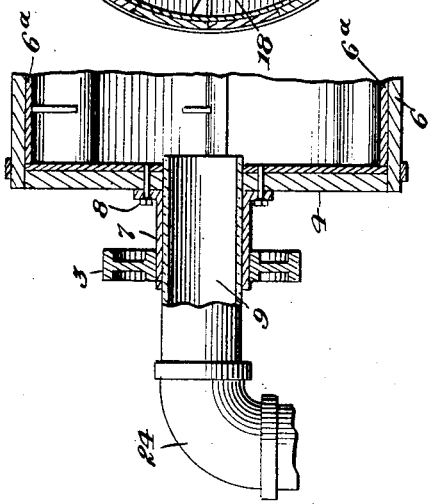
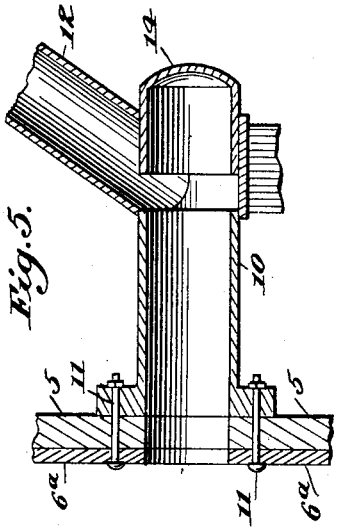
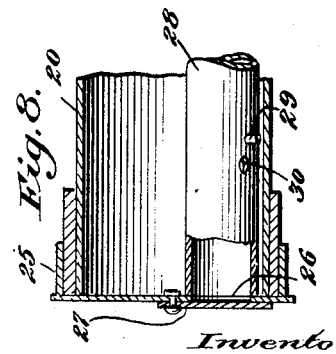
Inventor:
John Reid,
by Sturtevant & Mason
Att'ys.

Patented Oct. 18, 1932

1,882,904

UNITED STATES PATENT OFFICE

JOHN REID, OF LYONS, KANSAS, ASSIGNOR TO DIAMOND CRYSTAL SALT COMPANY, OF ST. CLAIR, MICHIGAN, A CORPORATION OF MICHIGAN

APPARATUS FOR PREPARING PRESERVATIVES

Application filed October 11, 1929. Serial No. 399,076.

The invention relates to new and useful improvements in an apparatus for preparing preservatives, and more particularly for preparing smoked salt.

An object of the invention is to provide an apparatus of the above character wherein smoke may be produced from the desired selected wood fibre and utilized for treating salt, and wherein said smoke is free from all objectionable fumes.

A further object of the invention is to provide an apparatus of the above type wherein means is provided for preventing the smoke from becoming scorched.

A further object of the invention is to provide an apparatus of the above type wherein the salt treated with the smoke is placed in a rotating drum and said drum is provided with means for lifting the salt and gradually discharging the same through the smoke.

A still further object of the invention is to provide an apparatus of the above type wherein the surface with which the salt contacts is of a material free from attack by the salt.

In the drawings:—

Fig. 1 is a view partly in side elevation and partly in section showing an apparatus embodying the invention.

Fig. 2 is a sectional view on the line 2—2 of Fig. 1.

Fig. 3 is a view partly in vertical section and partly in side elevation of the left hand end of the drum as shown in Fig. 1 and the parts immediately associated therewith.

Fig. 4 is a view from the left hand end of the apparatus shown in Fig. 1.

Fig. 5 is a vertical sectional view through the right hand end of the drum shown in Fig. 1, showing the connection to the pipe through which the smoke is discharged.

Fig. 6 is a sectional view through the retort on the line 6—6 of Fig. 1.

Fig. 7 is an enlarged longitudinal sectional view through the air supply pipe.

Fig. 8 is a longitudinal sectional view through the retort at the left hand end as shown in Fig. 1.

The invention is directed to an apparatus for preparing preservatives, and more particularly for preparing smoked salt. The apparatus includes a retort in which selected wood fibre is placed. Within the retort, spaced from the walls thereof and located adjacent the bottom, is an air supply pipe which is provided with suitable openings to circulate an air current through the wood fibre. When the outside of the retort is given an initial heating by means of a small burner suitably located therebeneath, a slow combustion of the wood fibre is produced which, augmented by the air current, will smoulder and create a desired amount of smoke. When the combustion of the wood fibre is completed and the contents reduced to ash, the ash may be removed and the retort recharged for further use and operation. The retort is connected at the discharge end with a drum in which the salt to be treated is placed. The drum is mounted for rotation and the inner face of the drum is lined with Monel metal or some other suitable material which is not attacked by the salt. The drum is rotated in any suitable way and is provided with lifting brackets which convey the salt to the upper side of the drum and discharge it gradually into the smoke. The drum is provided with a suitable outlet or discharge opening and a pipe leads therefrom to an exhaust fan which aids in circulating the smoke through the drum.

Referring more in detail to the drawings, the invention is shown as embodied in an apparatus which includes a drum 1 preferably made of wood which is mounted for rotation upon suitable supporting standards 2, 2. The drum may be rotated by means of a belt wheel 3 or any other suitable operating means. This drum consists of a body portion 6 and end members 4 and 5; these members are preferably made of wood. The drum is lined throughout with a material 6a which is not attacked by the salt; preferably monel metal is used. At the left hand end of the drum there is a trunnion sleeve 7 which is secured to the end 4 by means of bolts 8, 8. Passing through this sleeve 7 is a pipe 9 which has a free connection with the sleeve 7 so that the sleeve may rotate about said pipe. Said pipe is also provided with a glazed inner face. Attached to the other end of the drum is a trunnion sleeve 10 which is secured to the end portion 5 by means of bolts 11, 11. These two sleeves 7 and 10 are mounted in suitable bearings in the standards 2, 2 so that the drum freely rotates on said standards.

A discharge pipe 12 has a free connection with the sleeve 10 and at the upper outer end of said pipe 12 is an exhaust fan 13 driven in any suitable way. Thus it is that the draft is created through the drum which draws the smoke into the drum and discharges the same through the pipe 12. At the end of the sleeve 10 is a door 14 which may be utilized for controlling the opening leading to the pipe 12 and this door may be removed so that access may be had to the drum for removing samples of salt for determining the color, etc. At the opposite end of the drum there is an opening 15 which is closed by a suitable door 16, mounted in any suitable way. This affords an opening through which the drum may be charged with the salt and through which the salt may be removed after it has been treated with the smoke.

Fixed to the inner face of the drum are a series of lifting members 17. Each lifting member extends inwardly from the inner face of the drum in a radial direction and the extreme inner ends thereof are curved as indicated at 18. There are reinforcing webs 19 for these lifting members. The lifting member extends the full length of the drum. The drum rotates in the direction of the arrow in Fig. 2. As the drum rotates, the salt collecting by gravity at the bottom of the drum will be taken up by the lifting members in succession, carried to the top of the drum where the salt is gradually discharged from the curved end of the lifting member and falls through the smoke to the bottom of the drum.

The smoke for treating the salt is created in a retort 20. This retort is, as shown, cylindrical in form and mounted on a suitable supporting frame 21. The retort is preferably made of metal and is not enclosed so that the air circulates freely around the retort and prevents the smoke from being overheated and scorched. The right hand end of the retort is connected to an elbow pipe 22 which leads through a coupling 23 to an elbow pipe 24 which is attached to the outer end of the pipe 9. The other end of the retort 20 is closed by a cap 25 which has a sliding frictional contact with the end of the retort 20. There is an opening 26 through this cap and an adjustable cover plate 27 for said opening 26.

Located within the retort is an air supply pipe. This pipe is cylindrical and is mounted on legs 29, 29, which are so positioned that the pipe is held spaced away from the wall of the retort 20. The pipe is provided with two rows of openings 30, 30. The left hand end of the pipe adjacent the cap 25 is open. The right hand end of the pipe is provided with a discharge opening 31. The air supplied to the pipe 28 may be regulated by means of the small wicket plate 27 mounted on the cap 25. Selected hickory wood fibre is preferably used, and the retort is charged therewith. Beneath the retort 20 is a gas burner 32 which is provided with a series of jets 33, so disposed that when the burner is lighted a flame is produced spreading around the bottom portion of the retort directly beneath the burner 28 therein. After the retort chamber has been charged with the wood fibre, the gas burner is lighted for a few minutes in order to heat the retort and the burner and facilitate the starting of the distillation. As the wood is consumed the smoke passes from the retort into the drum for treating the salt. The draft of the exhaust fan on the drum causes a circulation through the retort and conveys the smoke free from objectionable fumes into the drum. As the smoke passes through the drum, the salt is carried by the lifting devices to the top of the drum and gradually discharged so that it falls through the smoke and thus it is that the salt is properly treated and the preservative produced.

The retort may be charged with a fresh supply of hickory wood and hickory sawdust by removing the cap 25. The ashes are removed by a small scraper from beneath the air pipe.

It is thought that the operation of the apparatus will be clear from the above description. The retort or distilling chamber is charged with the hickory wood fibre and the drum is supplied with the salt to be treated. The smoke from the retort passes through the drum and the salt is lifted and discharged through the smoke so that the smoke makes contact with the salt and thus it is that the salt receives the smoke treatment. The action which takes place when the smoke comes in contact with the salt is so well known that detailed description thereof is not thought necessary. The action which takes place in the retort producing the volatile distillate, referred to as smoke, is also so well known that the detailed description thereof is not thought necessary. It will be understood that the salt may be used in any desired form, either in granular or solid form.

It is obvious that minor changes in the details of construction and the arrangement of the parts may be made without departing from the spirit of the invention as set forth in the appended claims.

Having fully described my invention, what I claim as new and desire to secure by Letters Patent, is:—

1. In a device of the class described, a rotatable drum in which salt may be placed for treatment, said drum being mounted on trunnion sleeves through which smoke may be passed into and out of the drum, said drum having lifting devices projecting inwardly from the inner face thereof and shaped so as to convey the salt to the upper portion of the drum and gradually discharge said salt diametrically across the drum so that it falls through the smoke to the bottom of the drum, a pipe connected with the trunnion sleeves through which the smoke passes from the drum, and an exhaust fan associated with said pipe for forcing the smoke through the drum, said pipe with which the exhaust fan is associated having means for controlling the draft through the drum.

2. In a device of the class described, a drum in which salt may be placed for treatment, said drum having a cylindrical body portion and end walls closing the same, each end wall being provided with a trunnion sleeve located centrally thereof and projecting outwardly, a support on which said trunnion sleeves are mounted so that said drum may be rotated, a pipe connected to one of said trunnion sleeves through which smoke may be passed into the drum, a pipe connected to the other trunnion sleeve through which the smoke passes from the drum, the inner face of said drum being covered with a material free from attack by the salt, and provided with lifting devices shaped so as to convey the salt to the upper portion of the drum and gradually discharge said salt diametrically across the drum, so that it falls through the smoke to the bottom of the drum, said drum having a covered opening at one end thereof through which the salt after treatment can be removed.

3. In a device of the class described, a drum in which salt may be placed for treatment, said drum having a cylindrical body portion and end walls closing the same, each end wall being provided with a trunnion sleeve located centrally thereof and projecting outwardly, a support on which said trunnion sleeves are mounted so that said drum may be rotated, a pipe connected to one of said trunnion sleeves through which smoke may be passed into the drum, a pipe connected to the other trunnion sleeve through which the smoke passes from the drum, the inner face of said drum being covered with a material free from attack by the salt, and provided with lifting devices shaped so as to convey the salt to the upper portion of the drum and gradually discharge said salt diametrically across the drum so that it falls through the smoke to the bottom of the drum, said drum having a covered opening at one end thereof through which the salt after treatment can be removed, and a retort connected to said pipe for discharging smoke therethrough to the drum.

In testimony whereof, I affix my signature.

JOHN REID.